United States Patent
Claudio et al.

(10) Patent No.: US 9,952,060 B2
(45) Date of Patent: Apr. 24, 2018

(54) METHOD FOR THE REAL-TIME ESTIMATION OF THE TOTAL CONSUMPTION OF A FLUID DISTRIBUTED TO USERS, AND A DISTRIBUTION NETWORK IMPLEMENTING SAID METHOD

(71) Applicants: LYONNAISE DES EAUX FRANCE, Paris La Defense (FR); UNIVERSITE DE BORDEAUX 1, Talence (FR); UNIVERSITE DE BORDEAUX SEGALEN, Bordeaux (FR); INSTITUT POLYTECHNIQUE DE BORDEAUX, Talence (FR); INRIA, Le Chesnay (FR); IRSTEA, Antony (FR)

(72) Inventors: Karim Claudio, Bordeaux (FR); Vincent Couallier, Eysines (FR); Yves Legat, Bordeaux (FR); Jérôme Saracco, Saint Morillon (FR)

(73) Assignees: LYONNAISE DES EAUX FRANCE (FR); UNIVERSITE DE BORDEAUX 1 (FR); UNIVERSITE DE BORDEAUX SEGALEN (FR); INSTITUT POLYTECHNIQUE DE BORDEAUX 1 (FR); INRIA (FR); IRSTEA (FR)

( * ) Notice: Subject to any disclaimer, the term of this patent is extended or adjusted under 35 U.S.C. 154(b) by 176 days.

(21) Appl. No.: 14/434,887

(22) PCT Filed: Oct. 16, 2012

(86) PCT No.: PCT/FR2012/052355
§ 371 (c)(1),
(2) Date: Apr. 10, 2015

(87) PCT Pub. No.: WO2014/060655
PCT Pub. Date: Apr. 24, 2014

(65) Prior Publication Data
US 2015/0268061 A1    Sep. 24, 2015

(51) Int. Cl.
*G08C 19/16*    (2006.01)
*G08B 23/00*    (2006.01)
(Continued)

(52) U.S. Cl.
CPC ............... *G01D 4/002* (2013.01); *G01F 3/00* (2013.01); *G06Q 10/06* (2013.01); *G06Q 50/06* (2013.01)

(58) Field of Classification Search
None
See application file for complete search history.

(56) References Cited

U.S. PATENT DOCUMENTS 4,106,095 A * 8/1978 Yarbrough ............. G01R 15/18
324/103 R
4,562,552 A * 12/1985 Miyaoka ................... E03B 7/02
137/255
(Continued)

FOREIGN PATENT DOCUMENTS

FR        2915755        11/2008
WO     WO 0227616 A1 *   4/2002   ........... G06N 99/005

OTHER PUBLICATIONS

Author: David Jones, Titile: Pharmaceutical Statistics, Publication Date: Apr. 2002, Pertinent pp. 135-154.*
(Continued)

Primary Examiner — Steven Lim
Assistant Examiner — Muhammad Adnan
(74) Attorney, Agent, or Firm — The Belles Group, P.C.

(57) ABSTRACT

A method for the real-time estimation of the total consumption of a fluid, in particular water or gas, distributed from a unit (A) to users (b1, b2 . . . ) via a network of supply pipes
(Continued)

(E) with a branch (d1, d2 . . . ), for each user, fitted with a counter (c1, c2 . . . ) of the fluid consumed by the user, which method involves defining cohorts of users having homogeneous behavior with regard to the consumption of fluid; defining, for at least one of these cohorts, a sample of users from the cohort that is statistically sufficient to represent the cohort; fitting only the branches of the users of each sample with a remote reading device (t1, t2, . . . ) for reading the consumption; also fitting remote reading devices to the branches of the users of the other cohorts that have not been sampled; and processing the information provided by the remote reading devices to obtain a real-time value representative of the total consumption of the network.

9 Claims, 3 Drawing Sheets

(51) Int. Cl.

| G08C 15/06 | (2006.01) |
|---|---|
| G05D 9/00 | (2006.01) |
| G05D 27/00 | (2006.01) |
| G05D 27/02 | (2006.01) |
| G01D 4/00 | (2006.01) |
| G06Q 10/06 | (2012.01) |
| G06Q 50/06 | (2012.01) |
| G01F 3/00 | (2006.01) |

(56) References Cited

U.S. PATENT DOCUMENTS

| 6,038,594 | A* | 3/2000 | Puente | H04B 7/18582 |
| | | | | 709/217 |
| 6,330,516 | B1* | 12/2001 | Kammeter | G01R 19/2513 |
| | | | | 702/122 |
| 7,213,234 | B1* | 5/2007 | Below | G06F 11/3616 |
| | | | | 717/120 |
| 7,379,791 | B2* | 5/2008 | Tamarkin | G01D 4/004 |
| | | | | 700/286 |
| 2002/0091626 | A1* | 7/2002 | Johnson | G06Q 10/04 |
| | | | | 705/37 |
| 2005/0091335 | A1* | 4/2005 | Tapia | G01D 4/004 |
| | | | | 709/217 |
| 2005/0288918 | A1* | 12/2005 | Chen | G06F 17/5036 |
| | | | | 703/22 |
| 2007/0083478 | A1* | 4/2007 | Nonoyama | G06Q 10/06 |
| | | | | 705/412 |
| 2007/0083479 | A1* | 4/2007 | Swartz | G06Q 20/28 |
| | | | | 705/412 |
| 2007/0174335 | A1* | 7/2007 | Konig | G06F 17/30306 |
| 2008/0272933 | A1* | 11/2008 | Cahill-O'Brien | G01D 4/006 |
| | | | | 340/870.02 |
| 2009/0156955 | A1* | 6/2009 | Jung | A61B 5/0476 |
| | | | | 600/544 |
| 2009/0164401 | A1* | 6/2009 | Jung | G06Q 30/02 |
| | | | | 706/45 |
| 2009/0228320 | A1* | 9/2009 | Lopez | G06Q 30/0207 |
| | | | | 705/35 |
| 2010/0035244 | A1* | 2/2010 | Brody | C12Q 1/6886 |
| | | | | 435/6.14 |
| 2010/0141459 | A1* | 6/2010 | Pham | C02F 1/006 |
| | | | | 340/603 |
| 2010/0167659 | A1* | 7/2010 | Wagner | G01D 4/008 |
| | | | | 455/67.11 |
| 2010/0217549 | A1* | 8/2010 | Galvin | H04B 3/54 |
| | | | | 702/62 |
| 2010/0218108 | A1* | 8/2010 | Crabtree | G06Q 50/006 |
| | | | | 715/738 |
| 2010/0305889 | A1* | 12/2010 | Tomlinson, Jr. | G01D 1/00 |
| | | | | 702/62 |
| 2011/0095903 | A1* | 4/2011 | Gudlavenkatasiva | G01D 4/004 |
| | | | | 340/870.02 |
| 2011/0302125 | A1* | 12/2011 | Shetty | G06Q 50/06 |
| | | | | 706/52 |
| 2012/0052453 | A1* | 3/2012 | Besore | F24H 1/124 |
| | | | | 431/14 |
| 2012/0089523 | A1* | 4/2012 | Hurri | G06Q 10/10 |
| | | | | 705/304 |
| 2012/0323384 | A1* | 12/2012 | Park | H04L 12/2803 |
| | | | | 700/286 |
| 2013/0069951 | A1* | 3/2013 | Dembo | G06Q 10/06393 |
| | | | | 345/440.2 |
| 2013/0103215 | A1* | 4/2013 | Dai | G06Q 50/06 |
| | | | | 700/291 |
| 2013/0103656 | A1* | 4/2013 | Sanchez Loureda | G06F 17/30129 |
| | | | | 707/693 |
| 2013/0197814 | A1* | 8/2013 | McBratney | G01N 33/24 |
| | | | | 702/23 |
| 2013/0268126 | A1* | 10/2013 | Iwami | F24F 11/0086 |
| | | | | 700/276 |
| 2014/0142904 | A1* | 5/2014 | Drees | G06Q 10/04 |
| | | | | 703/2 |
| 2014/0180761 | A1* | 6/2014 | Yolles | G06Q 10/06311 |
| | | | | 705/7.29 |
| 2014/0214221 | A1* | 7/2014 | Matthews | G01D 4/004 |
| | | | | 700/291 |
| 2015/0019310 | A1* | 1/2015 | Young | G06Q 30/0223 |
| | | | | 705/14.16 |
| 2015/0137990 | A1* | 5/2015 | Riche | G01D 4/00 |
| | | | | 340/870.03 |
| 2015/0168177 | A1* | 6/2015 | Shah | G01D 3/00 |
| | | | | 340/870.02 |

OTHER PUBLICATIONS

Sampling procedures and tables for inspection by attributes. Washington, DC: Department of Defense, Military Standard MIL-STD-105E, May 10, 1989.*
Sampling Procedures and Tables for Inspection by Attributes. Washington, DC: Depatment og Defence, Military Standard MIL STD-105E, May 10, 1989.*
Corresponding International Search Report for PCT/FR2012/052355 dated Jun. 7, 2013.

* cited by examiner

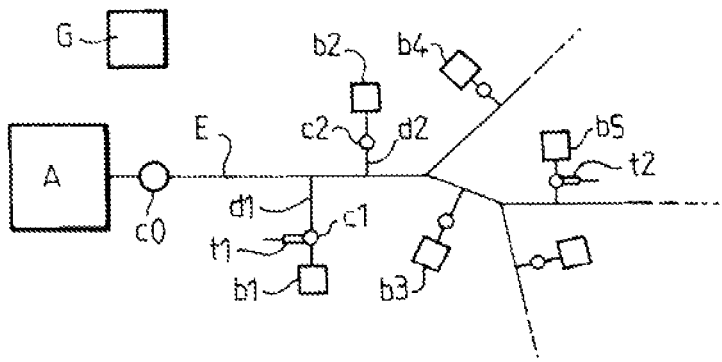
FIG.1
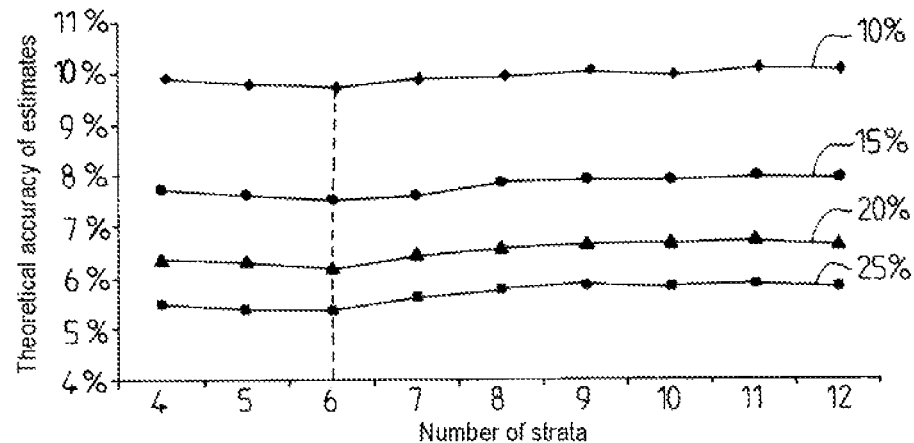
FIG.2
Breakdown of population by individual annual consumption
| Stratum | Limit (m³/year) | Consumption of stratum (m³) (% of total consumption) | $N_h$ (% of total population) | $n_h$ (Sampling rate) |
|---|---|---|---|---|
| 0 | < 0 | -224 | 4 (0.22%) | 2 (50.00%) |
| 1 | ]0;75] | 22 518 (9.72%) | 717 (39.35%) | 134 (18.89%) |
| 2 | ]75;140] | 71 785 (31.00%) | 682 (37.43%) | 88 (12.90%) |
| 3 | ]140;235] | 59 130 (25.53%) | 339 (18.61%) | 60 (17.70%) |
| 4 | ]235;999] | 25 873 (11.17%) | 65 (3.57%) | 65 (100%) |
| 5 | ]999,+∞] | 52 277 (22.57%) | 15 (0.82%) | 15 (100%) |
FIG.3

METHOD FOR THE REAL-TIME ESTIMATION OF THE TOTAL CONSUMPTION OF A FLUID DISTRIBUTED TO USERS, AND A DISTRIBUTION NETWORK IMPLEMENTING SAID METHOD

PRIORITY

Priority is claimed as a national stage application, under 35 U.S.C. § 371, to international patent application No. PCT/FR2012/052355, filed Oct. 16, 2012, the disclosure of which is incorporated herein by reference in its entirety.

The invention relates to a method for estimating in real time the total consumption of a fluid, in particular water or gas, distributed from a unit to users via a network of supply pipes with a branch for each user equipped with a meter for the fluid consumed by the user.

By "for estimating in real time the total consumption" is meant estimating the consumption over a fine time increment, for example consumption of a few hours or over a day, or a week, that is to say over a period of time that is relatively short compared to the period of invoicing based on the reading, which may a three-month period or even a year.

For the business supplying and distributing the fluids, for proper management of the distribution network, it is important to know the consumption in real time and its distribution between the various users. To be more precise, in the case of distribution of water, knowing the consumption in real time makes it possible detect anomalies in the network, notably if a significant difference occurs between the quantity of water supplied by the distributor and the quantity of water consumed according to the meters of users, which notably makes it possible to determined unauthorized drawing off or possible losses on line.

Remote reading of fluid meters, notably water meters, makes it possible to know the exact consumption drinking water of a user at a given time. However, using such a reading for all the users of a network leads to investment costs that are too high.

The most important object of the invention is to enable precise estimation of the total consumption of a network in real time without causing too high expenses in equipment and/or personnel to obtain the required consumption values.

In accordance with the invention, the method is characterized in that:
- cohorts of users are determined, cohorts of users comprising a number of users having a homogeneous behavior concerning the consumption of fluid,
- for at least one of these cohorts, a sample of users from the cohort is determined a number of which is less than the total number of users in the cohort, but statistically sufficient to represent the cohort,
- only the branches of the users of each sample are equipped with a remote reading device for reading the consumption,
- the branches of users in other cohorts that have not been sampled are also equipped with remote reading devices, and
- the information provided by the remote reading devices is processed to obtain in real time a value representative of the total consumption of the network.

Preferably, the cohorts of users are determined on the basis of a period of consumption of a plurality of months or a year and each cohort combines the users for whom the consumption over the considered period is between two predetermined consumption limits.

Advantageously, all the branches of users in the upper cohort, corresponding to the highest consumptions, are equipped with remote reading devices, while the other cohorts, corresponding to consumptions above the null value, are sampled and only the branches of the users of the sample of each cohort are equipped with remote reading devices.

The number of cohorts and the number of users in a sample may be determined in accordance with the required precision by the use of statistical rules.

The number of cohorts is advantageously equal to six. The highest cohort corresponds to the highest consumption.

Preferably the indices of consumption provided by the remote reading devices are fitted at fixed hour by interpolation.

The composition of the cohorts may be rectified by periodically updated information related to the consumption of the users.

The collected data is processed to eliminate outliers, to reconstitute missing data by interpolation or extrapolation and to determine the overall consumption.

Where n' denotes the total number of users of all the cohorts to be sampled, the size denoted $n_h$ of a sample within a cohort h is effected according to the Neyman allocation according to which the size $n_h$ depends on the headcount $N_h$ of that cohort and on the square root $S_h$ of the dispersion within this cohort:

$$n_h = n' \times \frac{N_h S_h}{\sum_{h=1}^{L-1} N_h S_h}$$

with L-1 equal to the number of cohorts sampled.

The invention also relates to a fluid, in particular water, distribution network employing the method previously defined, this network comprising a set of pipes supplied by a unit and branches equipped with meters to deliver to the users the fluid to be consumed, some of these branches being equipped with remote reading devices, this network being characterized in that the remote reading devices, the number of which is less than the number of meters, are distributed taking into account the consumption of each user, the probability of a branch being equipped with a remote reading device being in direct proportion to the consumption of the user connected to that branch.

Advantageously the number of branches equipped with remote reading devices greatly influences the accuracy of the estimators. At a required level of accuracy, notably for the detection of leaks, there corresponds a sampling rate specific to the chosen study area.

The number of branches equipped with remote reading devices may be less than or equal to 20%, notably approximately 10% of the total number of branches, and the remote reading devices are distributed in accordance with the consumption of each user sample so that the total consumption estimated with this limited number of remote reading devices is reliable to within ±10%.

Apart from the features explained above, the invention consists in a certain number of other features described more explicitly hereinafter in relation to embodiments described with reference to the appended drawings, but which are in no way limiting on the invention. In these drawings:

FIG. 1 is a schematic of a fluid distribution network.

FIG. 2 is a graph illustrating the accuracy of the estimators (relative errors) as a function of the number of cohorts and the sounding rate expressed as a percentage; the theoretical accuracy of the estimates is plotted on the ordinate axis as a percentage and the number cohorts is plotted on the abscissa axis; the various curves correspond from the top downward to sounding rates of 10%, 15%, 20% and 25% of users.

FIG. 3 is a table illustrating the division into cohorts of users connected to a water distribution network in accordance with the individual annual consumption.

Figure 6:
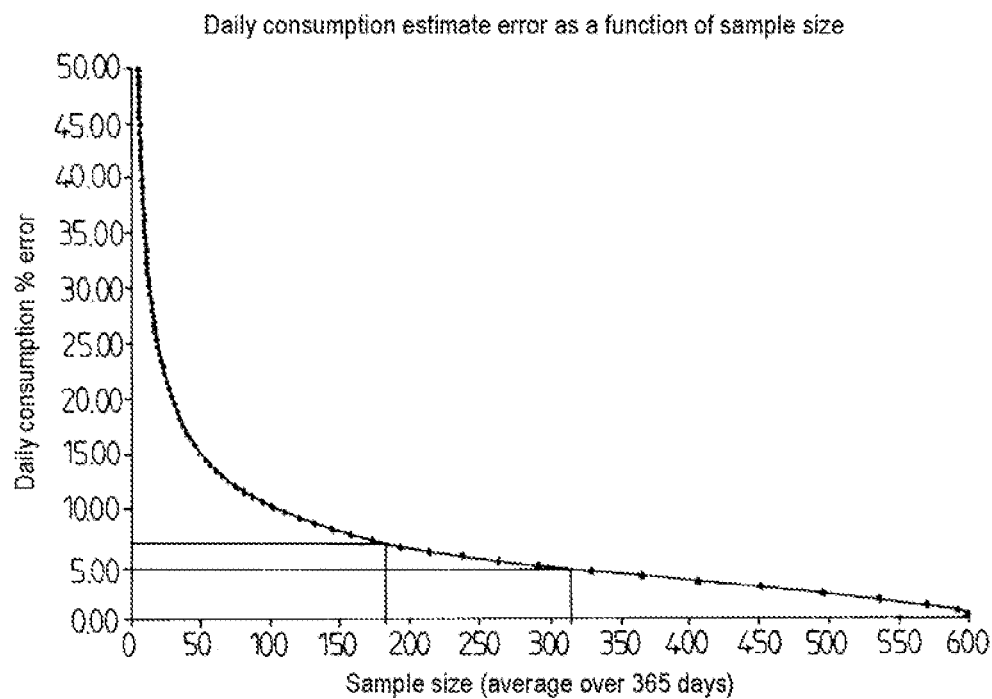
Figure 7:
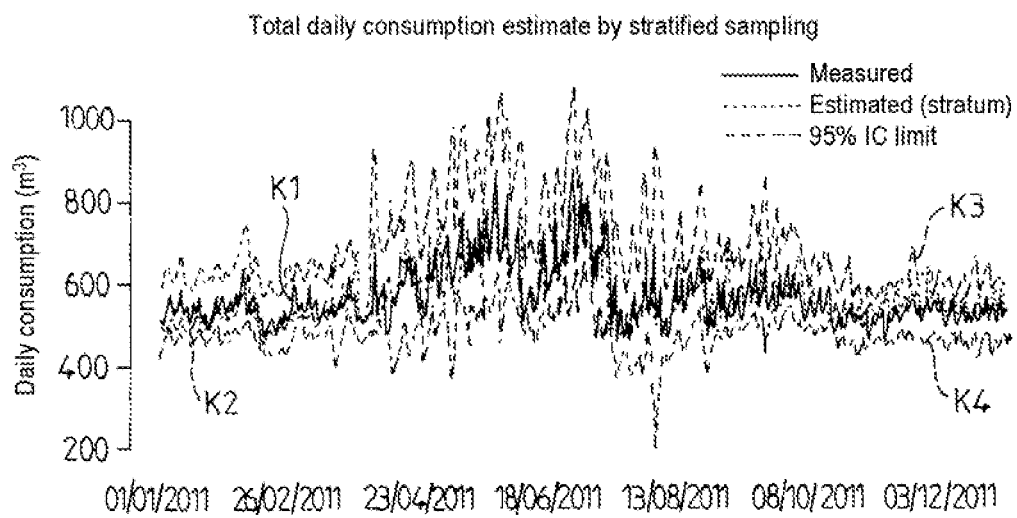

FIG. 6 is a graph illustrating the estimation error of a daily consumption as a function of the size of a sample plotted on the abscissa axis (averaged over 365 days) while the percentage error on the daily consumption is plotted on the ordinate axis, and FIG. 7 is a graph illustrating the estimation by stratified sounding of the total daily consumption over one year, the consumption being plotted on the ordinate axis and being represented by a solid line curve for the measured values, a dashed line curve for the estimated values, and two dotted line curves for the 95% index of confidence (IC95%) limits.

The following description is given with reference to a water distribution network but may be applied to any network distributing a fluid other than water, namely a gas distribution network.

FIG. 1 represent roughly and diagrammatically a network for distributing water from a production or storage unit A to users $b_1$, $b_2$ . . . via a network of pipes E equipped, at the level of a branch $d_1$, $d_2$ for each user, with a meter $c_1$, $c_2$, . . . for metering the water consumed by the user. Starting from the unit A, an overall meter $c_0$ is provided on the main pipe to determine the quantity of water supplied to the network.

Knowing the overall consumption of the various users in real time is important, for example, for determining an anomaly, such as an unauthorized drawing off from the network, by comparing the quantity consumed according to the meters and the quantity supplied according to the overall meter $c_0$.

The number of users connected to the same network can exceed several thousand. The method of the invention aims to make it possible to know the precise consumption of water of a population users over a finite time increment, in particular over the day, without this necessitating very high investments that would correspond to the deployment of a remote reading facility generalized to all users.

A remote reading device $t_1$ installed on a meter such as $c_1$ makes it possible to transmit remotely, in the form of an index, the water consumption measured at the given time, with the time of the reading indicated. This information, transmitted notably by radio, is collected by the center G including computing means for processing data and storage means.

The method accordance with the invention for estimating in real time the consumption, notably daily consumption, of water comprises, firstly, an indication of the users to be sampled and to be equipped with a remote reading device (remote metering senders $t_1$, $t_2$ . . . ).

Constitution of the Sample of Users to be Equipped

Cohorts of users are determined, those cohorts of users including a number of users having a homogeneous behavior in relation to water consumption. In this way the population is divided into consumption cohorts, that is to say into groups of persons exhibiting homogeneous behavior for the parameter concerned (water consumption). A sample is thereafter extracted from each of these cohorts.

Given the information on the data bases of a water distributor, the most pertinent information is the individual volume of water invoiced over a year, which is variable that correlates with a daily consumption.

Cohorts constructed on the basis of the invoice individual annual consumption might be referred to hereinafter as "consumption cohorts".

For the distribution network concerned, the objective is to obtain, from overall sample, the size of which is to be defined, as precisely as possible an estimate of the daily consumption of all the users of the network, with a limited investment, taking into account the known annual consumption.

FIG. 2 of the drawings shows that, for a global sounding rate P between 10 and 25%, the accuracy is the optimum and the estimation error is therefore the minimum for a number L of cohorts equal to 6.

The overall sounding rate P of the population of users corresponds to the ratio P=n/N of the number "n" of users sampled, that is to say equipped with a remote reading device, to the total number N of users.

The user population sounding rate P depends on the required accuracy shown by FIG. 6, which gives as a function of the size of the sample, expressed in units and plotted on the abscissa axis, the accuracy expressed as a percentage error on the daily consumption plotted on the ordinate axis. For an overall sample of approximately 180 units, the accuracy will be of the order 7%, and for an overall sample of 315 units, the accuracy will be of the order 5%.

Of the cohorts, two are fixed from the outset: cohort 0 corresponding to null or negative invoiced consumptions, for example as the result of an absence of consumption and/or accounting adjustments, and the top cohort (cohort 5 the example considered here) of "large consumers", whose individual annual consumption is equal to or greater than a fixed limit, for example 1000 m$^3$; these are mostly industrial enterprises, small and medium-size businesses, hospitals and other collective entities. Given their high consumption, the branches of these users will be comprehensively equipped with remote reading devices.

The remaining cohorts 1-4 are defined using a statistical method, in particular the so-called Serfling method, whereby the cohorts are divided up in accordance with the stratification variable distribution function. The distribution function of the random variable X is the function which, for any value x, associates the probability that the random variable X is less than or equal to x.

In the present case, the ransom variable is the invoiced annual consumption of water for the user. It is apparent from FIG. 4 that the probability, or cumulative frequency, of a user annual consumption being less than 1000 m$^3$ is approximately 99%. From FIG. 5, in which the annual consumptions plotted on the abscissa axis are more spread out, it is apparent that the probability of the annual consumption of the user being less than 20 m$^3$ is around 18% while the probability that the annual consumption of a user is less than 80 m$^3$ is around 42%.

Figure 5:
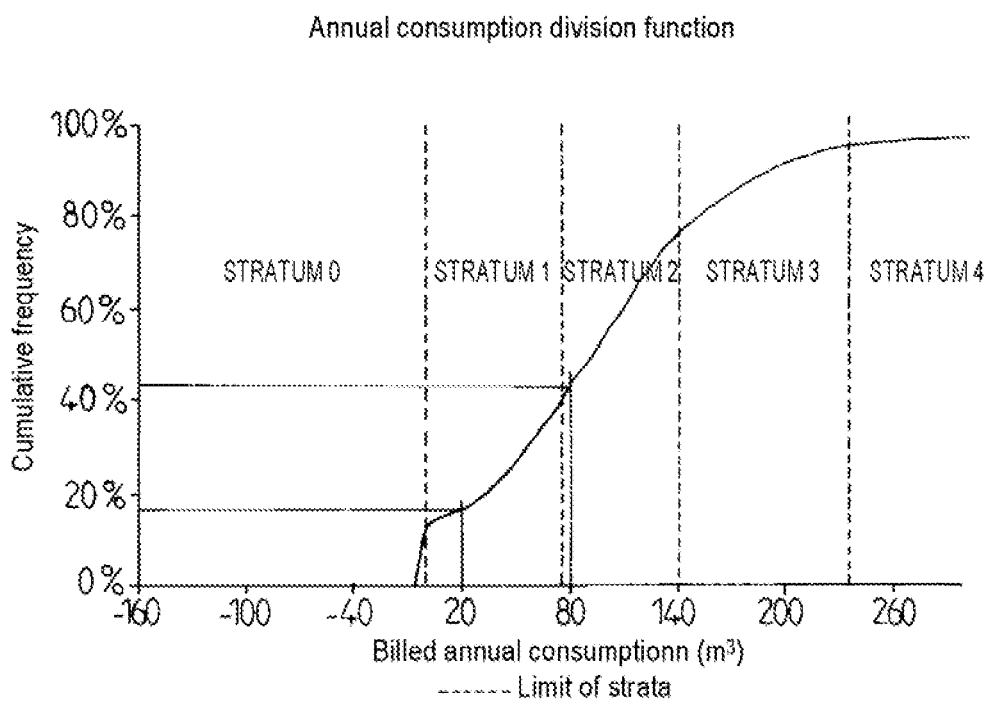
FIG. 5 is a graph similar to that of FIG. 4 of the distribution function with a smaller scale on the abscissa axis.

As shown in FIG. 5 an indicated in the FIG. 3 table, the cohort 1 corresponds to annual consumptions greater than 0 m$^3$ and at most equal to 75 m$^3$ a year. Cohort 2 corresponds to annual consumptions greater than 75 m³ and at most equal 140 m³. Cohort 3 corresponds to consumptions greater than 140 m³ and less than or equal to 235 m³. Cohort 4 corresponds to annual consumptions greater than 235 m³ and less than or equal to 999 m³. Cohort 5 corresponds to annual consumptions than 999 m³.

When the cohorts have been defined by the consumption limits, it remains to determine the number of users to be equipped with a remote reading device within a cohort, that is to say the sample of users for each cohort.

The number of users sampled in a cohort correlates with the accuracy of the estimator obtained. The number of users to be sampled is n=P×N, P being the sounding rate of the population of users, which depends on the required accuracy (FIG. 3).

The number users to constitute a sample in each cohort confirms to certain criteria, while the choice of the users in the cohort who will be equipped with a remote reading device is random until the number of users in the sample is reached.

For cohort 5, corresponding to "large consumers" who have for example an annual consumption equal to or greater than 1000 m³ all the users of this cohort 5 will be sounded comprehensively, that is to say will all be equipped with a remote reading device. In fact, because of their high consumption and their low effective equal to 15 less than 1% of the population of users in the example considered here it is relatively low cost exercise to equip them all with a remote reading device, rather than risking an estimation error that could be high.

If $N_G$ denotes the number of users belonging to cohort 5 there then remain n'=n−$N_G$.

The users are advantageously distributed in accordance with the Neyman allocation whereby the size $n_h$ of a sample in a cohort h depends on the headcount $N_h$ of that cohort and on the square root $S_h$ of the dispersion within this cohort:

$$n_h = n' \times \frac{N_h S_h}{\sum_{h=1}^{L-1} N_h S_h}$$

In the above formula, L is equal to the number of cohorts and L-1 to the number cohorts sampled.

Figure 4:
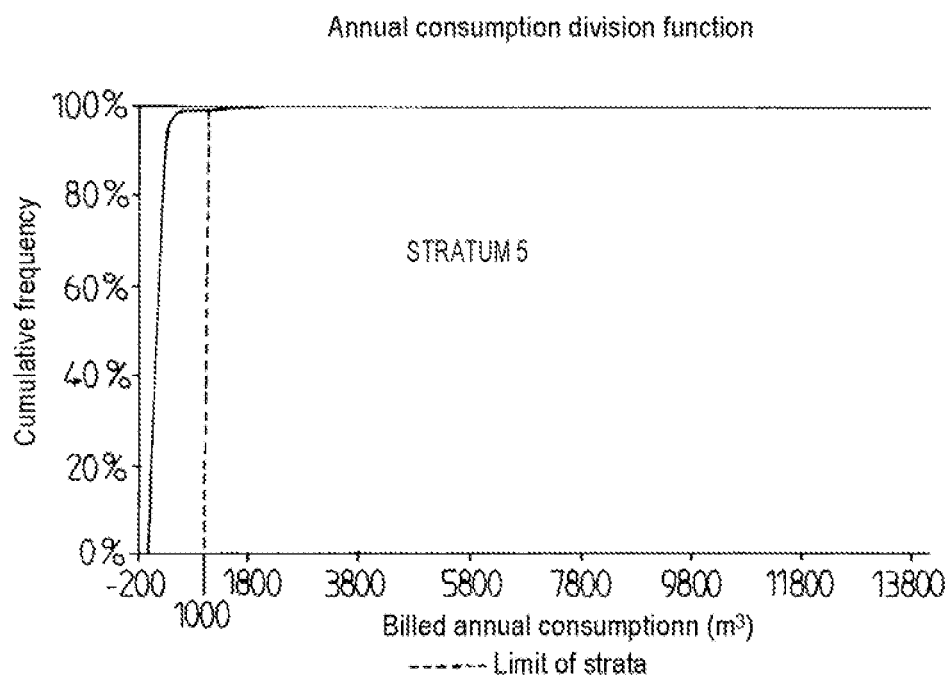
FIG. 4 is a diagram of the distribution function for the annual consumption of the users of the same distribution network, with a build annual consumption plotted on the abscissa axis to a large scale and the cumulative frequency expressed as a percentage plotted on the ordinate axis.

In FIGS. 4 and 5 the cohorts have been delimited by vertical dashed lines the abscissae of which corresponds to the numerical values of the limits given for the cohorts in the FIG. 3 table.

After the samples in the various cohorts have been selected, the branches of the users of each sample are equipped with remote reading devices that make it possible to acquire real consumption data over a particular time increments $\Delta_t$, notably in a time increment of 6 h, in which case four consumption indices per day are required for each user equipped with a remote reading device.

The acquired data includes at least the consumption index and the time at which this index was read off. The acquired data is raw data and processing of this data is necessary in accordance with the following process, implemented by software installed in the processing means of the center G:

a—index data validation/invalidation

A first, pre-processing phase consists in filtering the required data to set aside data that is manifestly erroneous and therefore invalid. Such data may originate from index data sending/receiving errors.

b—Reconstitution of index data at fixed times

The remaining indices can then be obtained at different times, for example at 6 h 10 when it is required to obtain the consumption index at a fixed time, for example 6 h. The consumption indices at fixed times notably 00 h, 06 h, 12 h, 18 h are determined on the basis of acquired data by an interpolation method that may be linear and/or as a function of the incoming flow rate. For such interpolation, between two consecutive indices, the consumption is considered either linear (linear interpolation) or proportional to the incoming bit rate (interpolation as a function of the incoming bit rate).

Estimation of Total Consumption

After processing, the data supplied by the remote reading devices is ready to be used to estimate consumption.

The samples having been constructed on the basis of a population of users divided into cohorts, the method consists in calculating an estimator resulting from this stratification. The estimator obtained is referred to as "without bias", that is to say that there is virtually no difference on average with respect to the real value. The accuracy differs as a function of the chosen sample size, however.

For each sample of each cohort, the mean daily consumption $\overline{y_h}$ is computered and then weighted of the cohort, that is to say by the effect of $N_h$ of the cohort. For a cohort, the estimated daily volume is therefore equal to $N_h \overline{y_h}$. The estimated total volume, for the same consumption, is equal to $$V_{daily} = \sum_{h=1}^{L} N_h \overline{y}h$$

Verification of the Method

To verify the results supplied by the method, a simulation has been carried out on an existing distribution network comprising 1822 users who were all equipped with a remote reading device.

The method according in accordance with the invention was applied to this population of users and the daily consumptions estimated with the aid of cohorts and samples of the overall population. The daily consumptions estimated in this way were compared to the real consumption that was known because all users were equipped with remote reading devices. The FIG. 3 table summarizes the conditions under which the cohorts and the samples were established. The limits of the cohorts have already been commented on.

The "cohort consumption" column expressed in m³ and % of the total consumption, over a year, is made of the following numbers:

Cohort 0: −224 m³; this negative value may correspond to consumption corrections for 4 users in this cohort.

Cohort 1: the total annual consumption is 22 518 m³, which represent 9.72% of the total consumption on the network for 717 users in this stratum (i.e. 39.35% of the total number of users); the sample of users for this cohort is made up 134 users (18.89% of the total number of users of the strata).

The data concerning cohorts 2, 3 and 4 can be read in the same way as for cohort 1.

With regard to the "large consumer" cohort 5, the number of users is equal to 15, and as already indicated, all the users of this cohort are taken into account, which corresponds to a sounding rate for the cohort of 100%.

Adding the number of users $N_h$ of each cohort yields 1822 users over the distribution network concerned.

Adding the numbers $n_h$ of samples of users equipped with remote reading devices, 364 is obtained, which corresponds to an overall sounding rate for all users of 20%.

The results of the simulation are shown in FIG. 7. Time is plotted on the abscissa axis and indicated in the form of dates extending over one year. The daily consumption expressed in $m^3$ is plotted on the ordinate axis.

The solid line curve K1 corresponds to the consumption measured using all the values supplied by the remote reading devices of all the users. The dashed line curve K2 corresponds to the estimated values of the daily consumption using samples determined in accordance with the method of the invention, with a small number of remote reading devices taken into consideration (20% in the example concerned).

It is apparent that the curve K2 is very close to the curve K1, and that the estimated value is close to the real value.

The curves K3 and K4 correspond to the limits of the 95% confidence range of the estimate.

The invention makes it possible to estimate in real time, with good accuracy, the food consumption of a network over a fine time increment, notably over one day, with a limited investment in terms of remote reading devices.

The time increment of the estimate of total consumption may be different from one day and could if necessary be reduced to 6 h or even 1 h.

A fluid distribution network in accordance with the invention is equipped with a small number of remote reading devices distributed over the branches of users determined by the samples.

Only the branches of a limited number of users are equipped with remote reading devices and the remote reading devices are distributed taking account of the consumption of each user over a period of several months, the probability that a branch will be equipped being in direct proportion to the consumption of the user connected to this branch.

The number of branches equipped with remote reading devices impacts on the accuracy of the estimator obtained. In the present study case with a minimum equipment rate of 10%, the estimation error does not exceed 10% of the real volume.

The invention claimed is:

1. A method for estimating in real time a total consumption of a fluid, the method comprising:
   distributing the fluid from a unit to users via a network of supply pipes having a branch for each user, each branch equipped with a meter for the fluid consumed by the user,
   determining cohorts of users, each cohort of users comprising a number of users having a homogeneous behavior concerning the consumption of fluid,
   determining, for at least one of the cohorts, a sample of users which is less than a total number of users in the respective cohort and is statistically sufficient to represent the respective cohort, wherein:
      only the branches for the sample of users of the at least one of the cohorts are equipped with a remote reading device for reading the consumption, and
      one or more of the branches for the users in cohorts other than the at least one of the cohorts are also equipped with remote reading devices, and
   processing information provided by the remote reading devices to obtain in real time a value representative of the total consumption of the network,
   wherein all the branches of users in an upper cohort of the cohorts, which corresponds to a highest consumption among the cohorts, are equipped with remote reading devices, while the cohorts other than the upper cohort, which correspond to consumptions above a null value, have fewer than all the branches sampled, with only the branches sampled being equipped with remote reading devices, and
   wherein 'n' denotes the total number of users of all the cohorts to be sampled, a size $n_h$ of the sample of users within a sampled cohort h within the at least one of the cohorts is effected according to a Neyman allocation according to which the size $n_h$ depends on a headcount $N_h$ of the sampled cohort and on a square root $S_h$ of a dispersion within the sampled cohort:

$$n_h = n' \times \frac{N_h S_h}{\sum_{h=1}^{L-1} N_h S_h}$$

with L-1 equal to a number of cohorts sampled.

2. The method as claimed in claim 1, wherein the cohorts of users are determined on the basis of a period of consumption of a plurality of months or a year and each cohort combines the users for whom the consumption over the considered period is between two predetermined consumption limits.

3. The method as claimed in claim 1, wherein the number of cohorts and the number of users in a sample are determined in accordance with a required precision by application of statistical rules.

4. The method as claimed in claim 1, wherein the number of cohorts is equal to six, with one cohort of null consumption.

5. The method as claimed in claim 1, wherein indices of consumption provided by the remote reading devices are fitted at fixed hour by interpolation.

6. The method as claimed in claim 1, wherein a composition of the cohorts is rectified by periodically updated information related to the consumption of the users.

7. The method as claimed in claim 1, wherein collected data is processed to eliminate outliers, to reconstitute missing data by interpolation or extrapolation and to determine the total consumption.

8. The fluid distribution network employing a method as claimed in claim 1, this network comprising a set of pipes supplied by a unit and branches equipped with meters to deliver to the users the fluid to be consumed, some of these branches being equipped with remote reading devices, wherein the remote reading devices, the number of which is less than the number of meters, are distributed taking into account a consumption of each user, a probability of a branch being equipped with a remote reading device being in direct proportion to the consumption of the user connected to that branch.

9. The fluid distribution network as claimed in claim 8, wherein the number of branches equipped with remote reading devices is less than or equal to 20%, notably approximately 10% of the total number of branches, and the remote reading devices are distributed in accordance with the consumption of each user sample so that the total consumption estimated with this limited number of remote reading devices is reliable to within about 10%.

* * * * *